(12) United States Patent
Wickland et al.

(10) Patent No.: US 6,395,050 B1
(45) Date of Patent: May 28, 2002

(54) VENT FILTER WITH DIRECT SAMPLE CAPABILITY

(75) Inventors: Terry J. Wickland, Evergreen; Michael D. Peterson, Parker; David E. Joseffy, Lakewood; Gilbert A. Brassell, Golden, all of CO (US)

(73) Assignee: Nuclear Filter Technology, Inc., Golden, CO (US)

( * ) Notice: Subject to any disclaimer, the term of this patent is extended or adjusted under 35 U.S.C. 154(b) by 0 days.

(21) Appl. No.: 09/680,505

(22) Filed: Oct. 5, 2000

(51) Int. Cl.[7] .............................................. B01D 53/04
(52) U.S. Cl. ........................ 55/385.4; 55/417; 96/413; 96/417
(58) Field of Search ............................ 55/385.1, 385.4, 55/417; 96/413, 414, 417; 210/237, 241, 416.5; 604/263, 199

(56) References Cited

U.S. PATENT DOCUMENTS

| | | | |
|---|---|---|---|
| 4,227,527 A | * | 10/1980 | De Frank et al. ............ 604/263 |
| 5,069,370 A | * | 12/1991 | Cady et al. ............... 222/464.3 |
| 5,083,686 A | * | 1/1992 | Cady et al. ............... 222/464.3 |
| 5,372,594 A | * | 12/1994 | Covacello et al. ......... 55/385.4 |
| 5,409,526 A | * | 4/1995 | Zheng et al. ............... 55/385.4 |
| 6,015,444 A | * | 1/2000 | Craft et al. ............... 555/385.4 |
| 6,207,051 B1 | * | 3/2001 | Anderson et al. .......... 55/385.4 |

* cited by examiner

Primary Examiner—David A. Simmons
Assistant Examiner—Minh-Chau T. Pham
(74) Attorney, Agent, or Firm—Millen, White, Zelano & Branigan, P.C.

(57) ABSTRACT

Vent filters for containers such as barrels which contain hazardous waste, such as transuranic (nuclear) waste, include a bore therethrough which does not intersect the material of carbon-to-carbon filter media inserts disposed within the vent filter. Each of the bores has a stainless steel tube disposed therein wherein the stainless steel tube has at an interior end a septa-type seal and at an outer end an impenetrable plug. In order to sample head gases, a syringe is used with a needle that penetrates the septa-type seal. After the needle is withdrawn, the septa-type seal closes and the impenetrable plug is replaced.

23 Claims, 2 Drawing Sheets

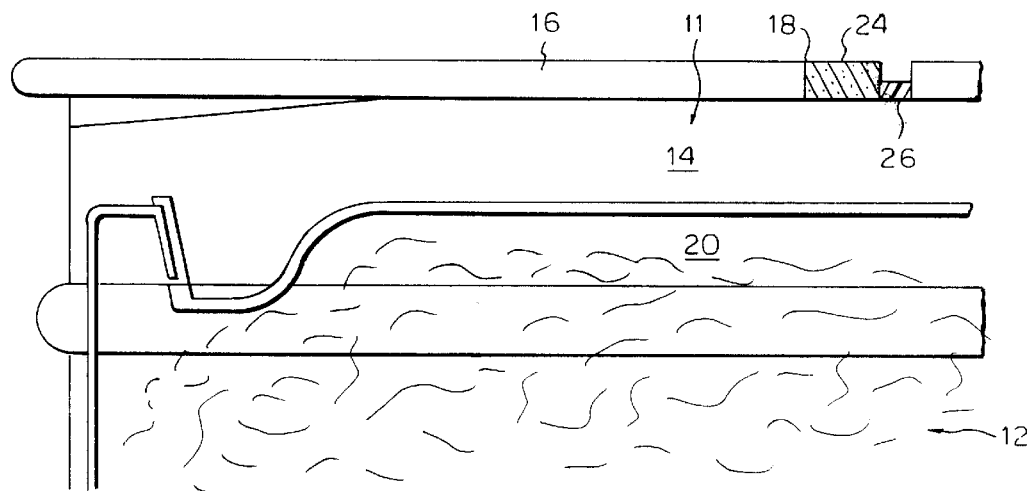
FIG.1
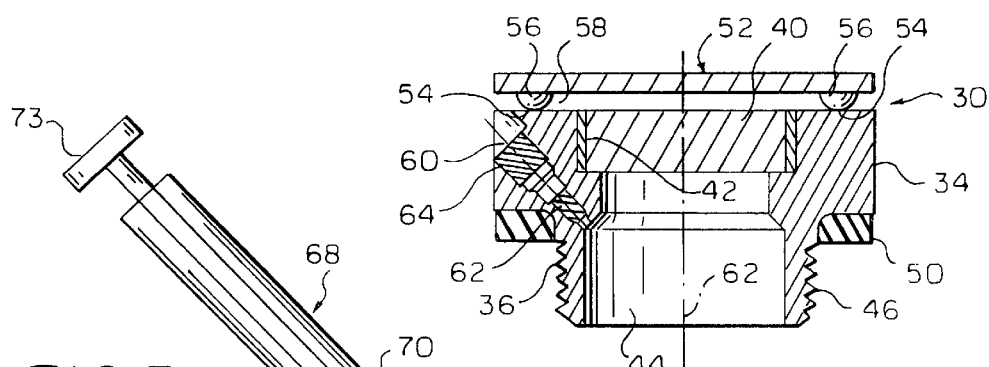
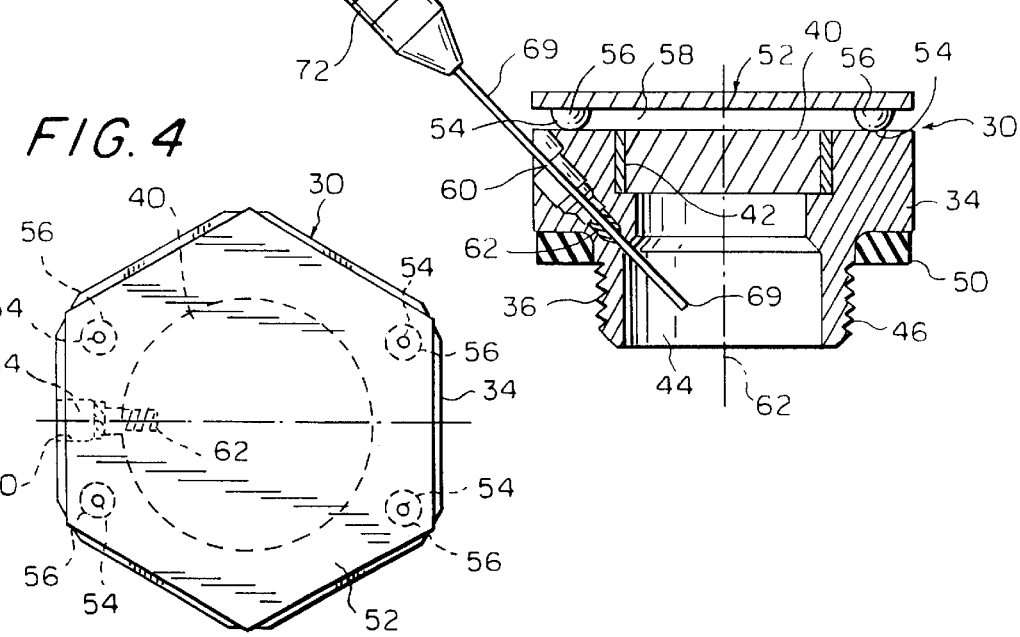
FIG.2
FIG.3
FIG.4

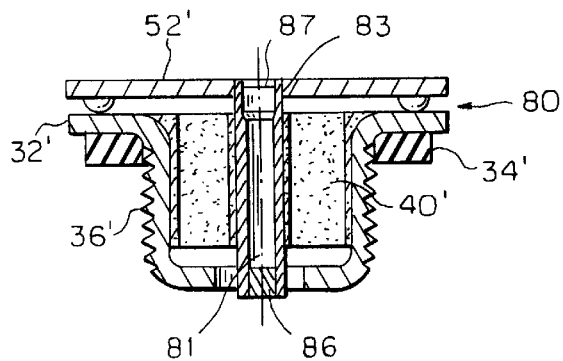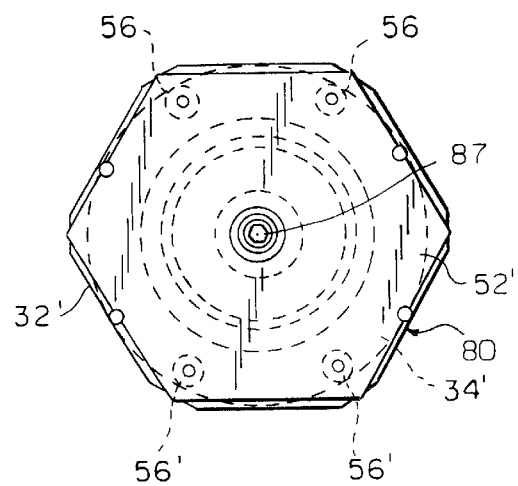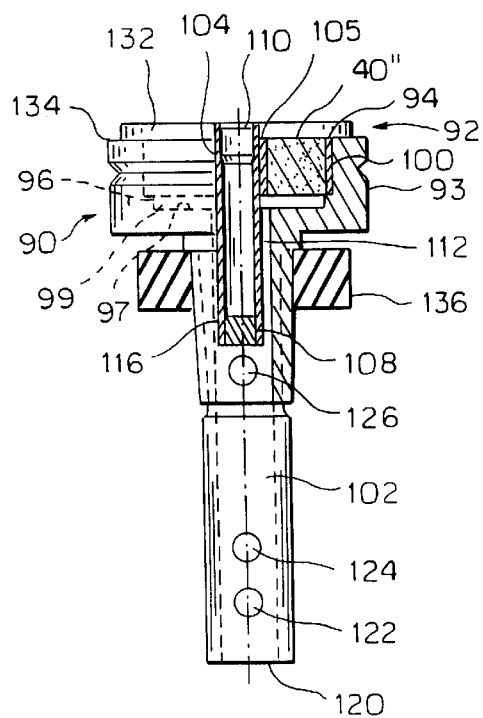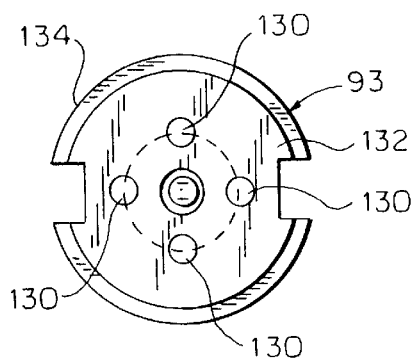

VENT FILTER WITH DIRECT SAMPLE CAPABILITY

FIELD OF THE INVENTION

The present invention is directed to a vent filter with a direct sample capability, more particularly, the present invention is directed to a vent filter with a direct sample capability wherein the vent filter is installed in a container which contains material that may include or generate gasses.

BACKGROUND OF THE INVENTION

Material contained in containers frequently include or generate gasses or vapors need, for various reasons, to be vented from the container. It is frequently necessary or desirable to have knowledge of what these gasses or vapors are so that decisions can be in made with respect to the material within the container. This is especially the case if the material in the container is hazardous waste which generates or includes gasses which are, for one reason or another, also possibly hazardous. For example, transuranic waste stored in containers such as drums, convenience cans or bags wherein hydrogen gas as well as volatile organic compounds may be generated from the waste. If these gases or vapors are not vented, an explosion can occur within the container and the explosion can disperse radioactive materials into the surrounding environment. Accordingly, it is necessary to sample head gases which accumulate above the stored transuranic material in order to determine whether or not hazardous gases are being generated and if the vent filters are performing satisfactorily to let the gases escape.

The prior art approach has been to sample head space gas prior to installing the vent filter by sampling directly through a vent hole in the lid of a container. If it was necessary to sample head space gas after installation of the vent hole filter, the vent hole filter needed to be removed prior to sampling. This of course discourages sampling of head space gas because rather complex procedures must be followed in order to remove vent hole filters when a container contains hazardous waste such as transuranic waste or hazardous materials such as titanium oxides and salts. This of course discourages taking bead gas samples when perhaps the safest approach would be to take those samples in order to have a more reliable monitoring program.

SUMMARY OF THE INVENTION

In view of the aforementioned considerations, it is a feature of the present invention to incorporate a sampling facility with a vent filter in order to facilitate and make less complex sampling of materials in the containers.

In view of this feature and other features, the present invention is directed to an arrangement for sampling head space gas in a container having materials therein which include or generate gas accumulated in a head space above the materials. The arrangement comprises a vent insert having a filter element therein, the vent insert being disposed of a housing, the housing having a second portion which does not include the filter element. A bore through the second portion of the housing is adapted to receive a probe therethrough for withdrawing a sample of head space gas. Me bore contains a seal for sealing around the probe when the probe is inserted.

In more specific aspects of the invention, the seal is an elastic deformable material which allows the probe to be thrust therethrough and reseals behind the probe as the probe is withdrawn and the bore includes threads for receiving a threaded closure so as to impenetrably close the bore.

In still other aspects of the invention, the bore is coaxial with the axis of the vent if the filter element is annular and defines a hollow core through which the bore extends. In still other aspects of the invention, the bore is disposed obliquely with respect to the axis of the vent at an angle which does not intersect with the filter element whereby the probe may be inserted to pass beside the filter element into the head space.

BRIEF DESCRIPTION OF THE DRAWINGS

FIG. 1 is a side elevation partially in section showing a container, such as a drum which includes a vent filter in accordance with the present invention;

FIG. 2 is a side elevation of a first embodiment of a vent filter configured in accordance with the principles of the present invention shown with a syringe used to withdraw a sample from the container with which the vent filter is used;

FIG. 3 is a side elevation similar to FIG. 2, but showing the syringe being inserted through the bore;

FIG. 4 is a top view of the first embodiment of the vent filter shown in FIGS. 2 and 3;

FIG. 5 is a side elevation of a second embodiment of a vent probe configured in accordance with the present invention;

FIG. 6 is a top view of the vent probe of FIG. 5;

FIG. 7 is a side elevation of a third embodiment of a vent probe configured in accordance with the present invention;

FIG. 8 is the top view of the vent probe of FIG. 7;

DETAILED DESCRIPTION

Referring now to FIG. 1, there is shown a container 10 which may, for example, be a drum or a convenience can for containing hazardous materials such as nuclear waste or other nuclear material that present a radiation hazard. Container 10 may also be a container for containing other types of materials which may or may not be waste materials, but which either have or generate a gaseous or fluid component which for one reason or another it is desirable to sample.

In the illustrated embodiment, the material needing immediate consideration is a transuranic material 10 which is generally a solid material and which may include or generate a gas 11 which it is necessary or desirable to vent. The gas 11 accumulates in a head space 14 above the material 12, underneath the lid 16 of the drum 10. The lid 16 has a vent hole 18 therethrough which communicates the space 14 with the surrounding atmosphere 20. In accordance with the present invention, vent hole 18 is plugged with a vent filter 22, the vent filter 22 including a filter media 24 and a bore 26. The bore 26 includes at least a sealing material 27 which keeps the bore 26 closed unless a needle 30 of a syringe 32 is pushed therethrough to withdraw a sample of the gas in the head space 14. Normally, all of the gas 11 in the head space 14 can vent through the filter media 24 so that particulate matter and compounds in the gas are trapped or adsorbed before the gas enters the surrounding atmosphere 20.

Generally, the filter media is a carbon composite filter media such as that disclosed in U.S. Pat. No. 4,500,328, incorporated herein in its entirety by reference. while a carbon composite filter media 24 is specifically disclosed, the filter element 24 may be of any suitable material which keeps harmful materials out of the atmosphere 20.

Turning now to FIGS. 2–4, there is shown a first embodiment of a vent filter 30 configured in accordance with the principles of the present invention, wherein the vent filter comprises a housing 32 having first portion 34 and a second portion 36. First portion 34 is hexagonal in shape so that it may be readily gripped by a wrench (not shown) has a cavity 38 therein which receives a carbon-carbon filter media insert 40. Both the cavity and insert are preferably cylindrical but may be other shapes if necessary or desired. The filter media insert 40 is retained in place with a layer of RTV silicon adhesive 42. spaced inwardly from the cavity 38 that holds the carbon-carbon filter media insert 40 is a cylindrical opening 43 that provides a hollow core to the second portion 36 of the housing 30, which second portion 36 has exterior threads 46 for threading into the vent opening 18 in the lid 16 oft he container 10 (see FIG. 1). Since the second portion 36 has a diameter less than the diameter of the first portion 34, a shoulder 48 is provided at their juncture, which shoulder is abutted by a gasket 50. A lid 52 is welded to the top surface of the first portion 34 of the housing 34 at weld points 54. The weld points 54 are at the bottom of projecting spacers or feet 56 which project from the lid 52 to define a gap 58.

In operation, gases such as hydrogen which have accumulated in the head space 14 of the container 10 (see FIG. 1) pass through the hollow core 44 and are filtered by the filter element 40 before entering the gap 58 and venting to the surrounding atmosphere 20.

In accordance with the present invention, the vent filter 30 is provided with a bore 60 which is oblique with respect to the axis 62 of the vent filter so that it does not intersect the filter media 40. The bore 60 is closed with two plugs, the first plug being a resilient plug 62 made of a silicon septa-type material and the first plug being a nylon tipped set screw 64. The first plug 62 is penetrable and self-sealing, while the second plug 64 is impenetrable.

In order to sample gas in the head space 14 of the container 10 (see FIG. 1), a syringe 68 which has a needle 69 is used. The impenetrable plug 64 is unscrewed and removed and the needle 69 is inserted through the sealing plug 62. Head space gas 11 is then withdrawn into the barrel 70 of the syringe 68 by pulling a plunger 72 in the barrel with a knob 73. The head space is then stored in the barrel 70 for analysis. The needle 69 is then withdrawn from the self-sealing first plug 62 and the bore 60. The bore 60 is then further sealed with the nylon tipped second plug 64 which is preferably in the form of a set screw that is threaded back into the bore 60, which bore has internal threads complementing those of the set screw. Consequently, gas 11 in the head space 14 may be conveniently and safely sampled whenever the vent filter 30 is accessible. Accordingly, it is not necessary to place the top of the container 10 in a glove box environment in order to analyze head space gases.

Referring now to FIGS. 5 and 6, there is shown a second detailed embodiment of the invention wherein the filter media insert 40' has an axial length which is longer than the axial thickness of the filter media 40 shown in FIGS. 2 and 3 and wherein the filter media insert is annular defining a hollow core 81. As with the first embodiment, the housing 72' has first portion 34' and a second portion 36', the second portion 36' being externally threaded for threading into the vent opening 18 in a lid 16 of a container 10. The vent filter 80 further includes a lid 52' which is welded to the first portion 34' of the housing 32', the lid 52' having a central opening 83 therethrough aligned with a hollow core 81 of the filter media 40'.

Disposed within hollow core 81 and the central opening 83 through the lid 52' there is a stainless steel tube 85. The stainless steel tube 85 includes a first plug 86 of a septa-type silicon material which is self-sealing and a second plug 87 which is an impenetrable material, the second plug preferably being in the form of a set screw which is nylon tipped at its inner end and screws into threaded end portion 88 of the tube 85. The second embodiment 80 of the vent filter functions substantially the same as the first embodiment 30 and receives the needle 69 of a syringe 68 in the same way with the first plug 86 allowing passage therethrough of the needle 69 and then sealing the tube 85 when the needle 69 is withdrawn (see FIG. 3). The second plug 87 is then screwed into the threaded end of the tube 85 to securely seal the tube 85.

Referring now to FIGS. 7 and 8 where a third detailed embodiment 90 of the vent filter is shown, the third embodiment is integrated with a filter cutter assembly 92 such as the filter cutter assembly disclosed in U.S. Pat. No. 6,041,669 issued Mar. 28, 2000 incorporated herein by reference. The filter cutter assembly 92 includes a housing 93 which has a cylindrical central cavity 94 which receives therein a carbon-to-carbon filter media insert 40". The filter media insert 40" rests on a shelf 86 within the cylindrical cavity 94 in spaced relation to the bottom 97 of the cavity so as to define a space 99. Preferably, the carbon-to-carbon filter media insert 40" is held within the cavity 94 by RTV silicon sealing adhesive 100.

Disposed within the normally hollow core of the annular filter media insert 40" is a stainless steel tube 104 which is secured coaxially with the annular filter media insert by a layer of RTV silicon 105. The stainless steel tube 104 has a septa-type seal 108 at the lower end thereof and an impenetrable plug 110 at the upper end thereof, the impenetrable plug being in the form of a nylon tipped set screw which is threaded into the threaded upper end of the stainless steel tube 104.

The diameter of the stainless steel tube 104 is less than the diameter of a bore 112 extending from the space 99 down through a tubular portion 116 of the housing 93. The tubular portion 116 has an insertion portion 118 which is received within the head space 14 of the barrel (see FIG. 1) and has an open end 120, as well as side ports 122, 124 and 126 that enable gas to enter the tubular portion 102. The head space gas then flows through these openings in the tube 116 so as to be conveyed by the bore 102 to the space 99. Since the space 99 communicates directly through the filter media insert 40', the gas passes through the filter media insert 40' and into the atmosphere through holes 130 in a lid 132 which is fixed to the upper surface 134 of the housing 93 by welding or by adhesive. A gasket 136 seals with the top surface oft he lid 16 of barrel 10 (see FIG. 1).

When it is necessary or desirable to sample the head space gas, the impenetrable plug 110 is removed and the needle 69 of the syringe 68 (see FIG. 2) is inserted through the stainless steel tube 104 and through the septa-type seal 108 to withdraw the gas into the syringe. After the sample has been taken, the needle is withdrawn so that the septa-type seal 108 closes and thereafter the impenetrable plug 110 is threaded back into the threaded end of the stainless steel tube 104.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An arrangement for sampling head space gas in a container having materials therein which include or generate head space gas which is vented continuously to the atmosphere, the arrangement comprising:

a vent insert having a housing with a filter element therein, the filter element being disposed within a first portion of a housing and being continuously in open communication with the container and in open communication with the atmosphere for filtering continuously head space gas as the head space gas vents to the atmosphere, the housing having a second portion which does not include the filter element;

a bore through the second portion, the bore being adapted to receive a probe therethrough for withdrawing a sample of head space gas, and a seal disposed in the bore.

2. The arrangement of claim 1, wherein the seal is an elastic deformable material which allows the probe to be pushed therethrough and reseals behind the probe as the probe is withdrawn.

3. The arrangement of claim 2, further including threads associated with the bore and a threaded closure cooperating with the threads for impenetrably closing the bore.

4. The arrangement of claim 3, wherein the bore is coaxial with the axis of the vent.

5. The arrangement of claim 4, wherein the filter element is annular defining a hollow core through which the bore extends, the bore having a hollow metal sleeve extending therethrough which has an inner end and an outer end, the seal being disposed at the inner end and the threaded closure disposed at the outer end.

6. The arrangement of claim 5, wherein the housing includes a separate lid fixed on and disposed in spaced relation thereto wherein the bore extends through the lid as well as the housing.

7. The arrangement of claim 5, wherein the housing has a projecting tubular portion surrounded at an upper end by a gasket and having a free lower end and wherein the sleeve projects into the tube.

8. The arrangement of claim 3, wherein the bore has an inner end and an outer end and wherein the seal is disposed at the inner end and the threaded closure at the outer end.

9. The arrangement of claim 1, wherein the housing includes a separate lid fixed on and disposed in spaced relation to the housing with the bore extending only through the housing without intersecting the filter element.

10. The arrangement of claim 1, wherein the housing and filter element are coaxial about the same axis and wherein the bore is at an angle to the axis and does not intersect the filter element.

11. An arrangement for sampling head space gas in containers having transuranic waste therein which include or generate as head space gas which is vented continuously to the atmosphere, hydrogen or volatile organic compounds, which present an explosive hazard, the arrangement comprising:

a vent insert having a housing with a filter element therein, the filter element being disposed within a first portion of a housing and being continuously in open direct communication with the container and continuously in open direct communication with the atmosphere for filtering head space gas as the head space gas vents to the atmosphere, the housing having a second portion which does not include the filter element;

a bore through the second portion, the bore being adapted to receive a probe therethrough for withdrawing a sample of head space gas, and a seal disposed in the bore.

12. The arrangement of claim 11, wherein the seal is an elastic deformable material which allows the probe to be pushed therethrough and reseals behind the probe as the probe is withdrawn.

13. The arrangement of claim 12, further including threads associated with the bore and a threaded closure cooperating with the threads for impenetrably closing the bore.

14. The arrangement of claim 13, wherein the bore is coaxial with the axis of the vent.

15. The arrangement of claim 14, wherein the filter element is annular defining a hollow core through which the bore extends, the bore having a hollow metal sleeve extending therethrough which has an inner end and an outer end, the seal being disposed at the inner end and the threaded closure disposed at the outer end.

16. The arrangement of claim 15, wherein the housing includes a separate lid fixed on and disposed in spaced relation thereto wherein the bore extends through the lid as well as the housing.

17. The arrangement of claim 15, wherein the housing has a projecting tubular portion surrounded at an upper end by a gasket and having a free lower end and wherein the sleeve projects into the tube.

18. The arrangement of claim 13, wherein the bore has an inner end and an outer end and wherein the seal is disposed at the inner end and the threaded closure at the outer end.

19. The arrangement of claim 11, wherein the housing includes a separate lid fixed on and disposed in spaced relation to the housing with the bore extending only through the housing without intersecting the filter element.

20. The arrangement of claim 11, wherein the housing and filter element are coaxial about the same axis and wherein the bore is at an angle to the axis and does not intersect the filter element.

21. The arrangement of claim 11 in combination with a drum having a lid and containing transuranic waste, wherein the housing of the valve insert has external threads for threading into the lid of the drum to retain the insert therein.

22. The arrangement of claim 21 wherein the filter element is a carbon-carbon filter element which traps particulate matter.

23. The arrangement of claim 1 wherein the filter element is a carbon-carbon filter element which traps particulate matter.

* * * * *